United States Patent Office 2,915,503
Patented Dec. 1, 1959

2,915,503

PROCESS FOR THE MANUFACTURE OF CAST RESINS OF UREA-FORMALDEHYDE AND THE LIKE, AND RESINS SO PRODUCED

Reinhard Ernst Vogel, Leutkirch, Allgau, Germany

No Drawing. Application December 28, 1956
Serial No. 631,043

Claims priority, application Germany December 13, 1951

6 Claims. (Cl. 260—70)

The present invention relates to a process for manufacturing improved thermosetting condensation products, and more particularly such resins which are adapted for use in casting compositions.

The object of the invention is the manufacturing of casting resins which are transparent and of glass-like appearance; they do not crack when stored or used for years; they may be machined by means of tools, e.g. fraised (milled), drilled and turned on a lathe. Said resins are unsoluble in lacquer solvents, which are rapidly evaporating organic solvents such as butanol, toluene, benzene etc. The latter property is especially important, when the casting resins are used in the manufacture of buttons and similar articles for wardrobe, which should remain unaffected by dry-cleaning.

In general, I have found that the objects of this invention are accomplished and superior casting resins are obtained by the process comprising the steps of heating the reaction product of urea and formaldehyde, or a mixture of formaldehyde and acetaldehyde, or a mixture of formaldehyde with no more than 50% acrylaldehyde or no more than 25% glyoxal, the acrylaldehyde or glyoxal being calculated on the amount of mols of formaldehyde, 2–2.4 mols of formaldehyde or an equivalent amount of said mixture being used per mol of urea, precondensing the reaction product by boiling it for 1–9 hours at a pH above 6.1 and below 6.85, taking regularly samples from the product and permitting each sample to cool to 18° C. to measure said pH, maintaining said pH during precondensation by adding to the reaction product a finely pulverized catalyst selected from the group consisting of Pb, CoO, Cd, CdO, Zn, ZnO, and $Mn_2O_3$ with traces of iron salts, the amount of catalyst being calculated on the basis of 0.11 to 0.85 kg. per 100 kg. of pure aqueous formaldehyde of 37% concentration, removing the catalyst and the largest part of water present in the reaction product to obtain a viscous product, lowering the pH of the viscous product to below 5.1, adding an alcohol containing between three and seven carbon atoms to the viscous product, the amount of alcohols being between 5.0 parts and 37.3 parts per 100 parts of said urea and completing the condensation in vacuum. These condensation products are viscous liquids and are insoluble in lacquer solvents.

From the condensation product obtained by this process part of the water is removed by distilling in vacuo, preferably 82–96%, and the residual water content is preferably removed thoroughly by placing the condensation product into vapor-permeable molds and evaporating the water. Otherwise, the condensation product is removed from its vessel when it reaches a plastic gel state and the residual water allowed to evaporate at room or higher temperature. These products are then machined in the well-known way to articles desired.

In the specification and claims, reference to "a plastic gel state" indicates a condition when the resin does no longer flow but is still soft enough to be moldable by finger pressure at a temperature of from 20–65° C.

It is to be understood that the reaction mixture is first neutralized to a pH of 6.9–6.95, or higher, e.g. 8.0, as usual, and said above-mentioned pH value of above 6.1 and below 6.85 is obtained only during the condensation. The mol ratios of the reactants in the reaction mixture are 2–2.4 mols of formaldehyde per mol of urea.

The pH value is regulated during condensation by the addition of catalysts which should be very finely comminuted and should preferably be of dust- or powder-like consistency. In accordance with the invention, the catalysts are selected from the group consisting of lead, cobaltous oxide, cadmium, cadmium oxide, zinc, zinc oxide and manganic oxide (in the latter case with traces of iron salts).

The condensation is carried on for a period from about 1–9 hours, preferably about 3–8 hours.

The effectiveness of the various catalysts and their mixture varies and the amount of catalyst must be correspondingly adjusted to obtain the desired pH. Generally the effectiveness of the catalyst will increase and a smaller amount will be needed if the fineness of the substance is increased. The amount of catalysts may vary between 0.85 and 0.11 kg. per 100 kg. of aqueous formaldehyde of 37% concentration. In case of a derivative of formaldehyde for the calculation the contents in formaldehyde must be taken into consideration: 1 kg. acetaldehyde (37%) corresponds to 0.68 kg. formaldehyde (37%).

After the water is removed in vacuo from the precondensation products manufactured with the aid of the catalysts, preferably at a temperature not exceeding 60° C., transparent resins are obtained which are soluble in water. By adding acids or acidic salts, these resins become water-insoluble. The products obtained by this precondensation process may be used, for instance, as lacquers, textile finishing media, and as glues, i.e. in the manufacture of paper.

According the process of the invention it is necessary to remove the catalysts and to distill the water in vacuo at a temperature preferably not exceeding 60° C. to obtain a viscous liquid, whereafter the pH is changed to the acidic side below 5.1, and preferably between 4.3 and 4.8, and simultaneously the resin is etherified with alcohol, the amount of alcohol being between 5.0 parts and 37.3 parts per 100 parts of said amine. The pH is kept to or above 6.1 until the vacuum distillation begins. The pH is shifted below 5.1 after the distilling off of the water has resulted in a viscous liquid. The etherification in the acidic medium with the alcohol containing at least three carbon atoms is carried out for a period of from some minutes to 20 minutes.

For instance, if a mixture of lactic acid and butyl alcohol is added to the condensation product, the pH may be lowered to the desired value and distillation in vacuo for a short period of time will result in etherification of most of the OH-groups created by the addition of the aldehyde. Etherification may be effected by heating the condensation product to the boiling point in vacuo during the removal of the water.

It is preferred to change the pH of the condensation product by means of organic acids with or without double bonds, or their anhydrides, examples of such substances being formic acid, lactic acid, acetic acid anhydride, acrylic acid, methacrylic acid, succinic acid, maleic acid anhydride, benzoic acid, oxybenzoic acid, aminobenzoic acid, salicylic acid, and the like. The acidification agent may also be an acidic salt, for instance aluminium sulfate or iron chloride.

Alcoholic etherifying agents include all suitable alcohols such as all aliphatic monovalent, saturated or unsaturated, alcohols containing at least three carbon atoms, as well as aliphatic polyvalent alcohols and aromatic alcohols if they are, even slightly, soluble in water. Examples are n-butyl alcohol, n-amyl alcohol or benzyl alcohol, oxybenzyl alcohol, propenyl glycol, glycerol, and the like, as well as mixtures of such alcohols. If desired, the alcohol may be added at the beginning of the vacuum distillation or even at the beginning of the condensation.

Since it is not possible to remove the last residue of water from the condensation product without impairing its aptitude to be cast, it is necessary either to remove the cast resin from its mold after it has reached a plastic gel state so that the remainder of the water may evaporate, or to use molds or vessels which are water-vapor permeable, the hardening of the resin being effected at temperatures between 20 and 65° C., preferably 30 to 50° C.

Suitable materials for vapor permeable molds or vessels include terracotta, porous plaster of Paris, porous concrete, wood, cellulose, cellulose derivatives, various synthetic materials, such as cellophane, and natural and artificial pellicles and tubes. The nature of the material is of no consequence as long as it is permeable to water vapor. Synthetic materials for such molds may also include polymerization products of vinyl chloride and vinyl acetate, nitration or acetylation products of cellulose, or polymerization products of ethylene or ethylene oxide, provided they are perforated or so thin that they allow evaporation or diffusion of water. It may be desirable to coat such forms with a nitro lacquer, i.e. nitro cellulose, so that the resin may be removed more easily from the mold.

The preferred aldehyde constituent in the precondensate is formaldehyde, for instance a 37% solution of formaldehyde. However, it is also possible to substitute the formaldehyde partially by acetaldehyde. Up to 50%, preferably no more than 12.5%, of formaldehyde may be substituted by acrylaldehyde or up to 25%, preferably no more than 5% glyoxal. All figures given for the replacement of formaldehyde by other aldehydes are given in mols. If e.g. 1 mol formaldehyde is taken, at most 1 mol acryl aldehyde is taken or ½ mol glyoxal.

The other preferred constituent in the precondensate is urea, the conventional mol ratio of 1 mol of urea to 2–2.4 preferably according to the invention 2.08–2.2 formaldehyde (37%), being maintained. If desired, 25% thiourea, based on the weight of the urea, may be added before the step of the vacuum distillation or before the end of the process (i.e. before lowering the pH). Preferably, no more than between 8–12% of thiourea is added to the condensation product.

The condensation product according to the invention may be mixed with a condensation resin, prepared with phenol instead of urea. In this case it is possible to proceed with the urea condensation and the phenol condensation separately, in a manner known per se, and to combine the condensation products after their vacuum distillation, to lower the pH below 5.1 with the addition of alcohol and to proceed further in the above-described manner.

It is also possible to work under pressure using preferably 1–4 atm. The temperature for the condensation is preferably the boiling point of the mixture, otherwise a bit below the boiling point.

It should be noted that the alcohol present in the reaction mixture prior to precondensation in the following examples has for its purpose merely facilitating dissolution of the starting materials. It is the second addition of alcohol, after the precondensate has been formed, which enables etherification and further condensation of the precondensate.

The following examples, while in no sense limitative of the scope of the invention, will illustrate certain preferred procedures, all parts being by weight unless otherwise indicated:

Example I 114 parts of 36.8% formaldehyde neutralized by means of watery ammonia to a pH of 7.0, 37.5 parts of pure urea, 0.36 part of cadmium dust and 1 part of n-butanol are brought to a boiling temperature in 50–60 minutes and are maintained at boiling temperature for four hours. The cadmium catalyst is then filtered off and the water is evaporated in a vacuum until a viscous liquid is obtained. There is then added to the liquid 0.25 part of acetic acid anhydride in 2 parts of n-butanol and the mixture is again distilled in vacuo for 2–3 minutes. The condensation product is then drawn off.

Example II 80 parts of 37% formaldehyde neutralized by means of agitating with powder of calcium carbonate and filtering off to a pH of 7.1, 25 parts of pure urea, 0.2 part of zinc dust and 0.1 part of pure zinc oxide are processed as in Example I up to the vacuum distillation. Thereupon 2.5 parts of thiourea suspended in 2 parts of n-butanol are added, the liquid is distilled in a vacuum until a viscous liquid is obtained and then further treated as described in Example I.

Example III 110 parts of 37% formaldehyde, neutralized according to Example I, 37 parts of pure urea, and 0.400 part of zinc dust are mixed and dissolved. They are then heated at the boiling point for 4½ hours. Then the reaction mixture is distilled in vacuo and 0.360 part of acetic acid anhydride in 1.85 parts of n-butanol are added to bring the pH to 4.6. The mixture is again distilled for 15 minutes under vacuum, the forms are filled and the condensation product is hardened at a temperature between 25–30° C.

Example IV

A mixture of 90 parts formaldehyde neutralized according to Example I, 52 parts of 40% acryl aldehyde, 37.5 parts of pure urea, 0.2 part of lead dust, 0.2 part of cadmium dust and 4 parts of n-butanol are treated as in Example I.

Example V

A mixture of 90 parts formaldehyde neutralized according to Example I, 31 parts of 32% glyoxal, 37.5 parts of pure urea, 0.18 part of zinc dust, 0.22 part of $Mn_2O_3$ powder (with traces of iron salts) and 1 part of glycerol are treated as in Example I.

Example VI 10 parts pure phenol, 24 parts formaldehyde, 0.035 part hydroxide of potassium in solid form are mixed and heated under strong agitation during two hours at 65–75°, distilled in vacuo to a viscous liquid and added to a condensate obtained in the following way: 118 parts formaldehyde neutralized according to Example I, 37.5 parts pure urea, 2 parts n-butanol and 0.4 part powder of cadmium are mixed, dissolved and heated during 30 minutes up to the boiling point and kept boiling during 3.5 hours; finally, the mixture is distilled to result in a viscous liquid.

After mixing with the first mentioned condensate and addition of 2 parts n-butanol, 2 parts glycerine and 1.1 parts of lactic acid, the mixture is distilled in vacuo during 2–3 minutes and drawn off into forms.

Example VII 114 parts of 36.8% formaldehyde neutralized by means of watery ammonia to a pH of 7, 37.5 parts of pure urea, 0.3 part of zinc dust and 4 parts of benzyl alcohol are brought to a boiling temperature in 30 minutes and are maintained at boiling temperature for four hours. The zinc catalyst is then filtered off and the water is evaporated in a vacuum until a viscous liquid is obtained. Then is there added to the liquid 0.07 part of formic acid (85%) in 9 parts of benzyl alcohol and 5 parts of n-butanol and the mixture is again distilled in vacuo for 20 minutes until a very viscous liquid is obtained at a temperature not exceeding 60°. This product is not soluble in butanol and toluene.

This is a continuation-in-part of my application Serial No. 321,268, filed November 18, 1952, now abandoned.

What is claimed is:

1. A process for the manufacture of a casting resin, comprising the steps of heating the reaction product urea and a substance selected from the group consisting of formaldehyde, a mixture of formaldehyde and acetaldehyde, a mixture of formaldehyde with no more than 50% acrylaldehyde and a mixture of formaldehyde with no more than 25% glyoxal, the acrylaldehyde and glyoxal being calculated on the amount of mols of formaldehyde, 2–2.4 mols of said substance being used per mol of urea, pre-condensing the reaction product by heating it at boiling temperatures for 1–9 hours at a pH above 6.1 and below 6.85, taking regularly samples from the product and permitting each sample to cool to 18° C. to measure said pH, maintaining said pH during precondensation by adding to the reaction product a finely pulverized catalyst selected from the group consisting of Pb, CoO, Cd, CdO, Zn, ZnO, and $Mn_2O_3$ with traces of iron salts, the amount of added catalyst being 0.11 to 0.85 kg. per 100 kg. of pure aqueous formaldehyde of 37% concentration, removing the catalyst and the largest part of water present in the reaction product to obtain a viscous product, lowering the pH of the viscous product to below 5.1, adding an alcohol containing between three and seven carbon atoms to the viscous product the amount of alcohol being between 5.0 parts and 37.3 parts per 100 parts of urea and completing the condensation in vacuum.

2. The manufacturing process of claim 1, wherein the heating is continued for 3–8 hours and the pH of condensation before removal of water is maintained between 6.35 and 6.8.

3. The manufacturing process of claim 1, wherein water is removed from the reaction product in a vacuum at a temperature not exceeding 60° C.

4. The manufacturing process of claim 1, wherein the last remaining water in the condensation product is removed by placing the product in vapor-permeable molds, the water being allowed to evaporate and to diffuse at temperatures of 20–65° C.

5. The manufacturing process of claim 1, wherein the product is placed in molds and heated at temperatures of 20–65° C. until it has reached the plastic gel state, the product is removed from the molds and the last remaining water is evaporated.

6. As a new and useful composition of matter, a casting resin of glass-like appearance, solid at ordinary temperatures, being insoluble in lacquer solvents, resistant to cracking for years and adapted to be machined, said casting resin comprising a condensation product of urea with a substance selected from the group consisting of formaldehyde, a mixture of formaldehyde and acetaldehyde, a mixture of formaldehyde and no more than 50% of acrylaldehyde and a mixture of formaldehyde and no more than 25% glyoxal, the acrylaldehyde and glyoxal being calculated on the amount of mols of formaldehyde, 2 to 2.4 mols of said substance being present per mol of urea, said condensation product being the product of reaction between the urea and said substance pre-condensed, in the presence of a finely pulverized catalyst selected from the group consisting of Pb, CoO, Cd, CdO, Zn, ZnO and $Mn_2O_3$ with traces of iron salt, at a pH above 6.1 and below 6.85, the catalyst and the largest part of water present in the reaction mixture having been removed before the condensation is completed to obtain a viscous reaction mixture, an alcohol containing between three and seven carbon atoms having been added to the viscous reaction mixture in the amount of between 5.0 and 37.3 parts per 100 parts of urea and the condensation having been completed in a vacuum, the pH of the viscous reaction mixture having been lowered to below 5.1.

References Cited in the file of this patent
UNITED STATES PATENTS 2,377,422     Hodgins et al.    ---------- June 5, 1945